(12) United States Patent
Kay

(10) Patent No.: US 8,701,337 B2
(45) Date of Patent: Apr. 22, 2014

(54) METHOD FOR PEST CONTROL

(76) Inventor: Daniel J. Kay, Columbus, OH (US)

( * ) Notice: Subject to any disclaimer, the term of this patent is extended or adjusted under 35 U.S.C. 154(b) by 119 days.

(21) Appl. No.: 13/587,502

(22) Filed: Aug. 16, 2012

(65) Prior Publication Data

US 2012/0311918 A1    Dec. 13, 2012

Related U.S. Application Data

(62) Division of application No. 12/855,460, filed on Aug. 12, 2010.

(51) Int. Cl.
*A01M 25/00* (2006.01)
*A01M 1/20* (2006.01)

(52) U.S. Cl.
USPC .............. 43/131; 43/120; 206/818; 220/483; 220/230

(58) Field of Classification Search
USPC ............ 43/131, 120; 206/350, 818; 220/483, 220/223, 230
See application file for complete search history.

(56) References Cited

U.S. PATENT DOCUMENTS

| | | | | |
|---|---|---|---|---|
| 1,597,551 A * | 8/1926 | Stewart | ............................. | 43/69 |
| 2,544,026 A * | 3/1951 | Kern et al. | ........................ | 43/61 |
| 3,017,717 A * | 1/1962 | Caubre | ........................... | 43/131 |
| 3,177,608 A * | 4/1965 | Lindelow | ........................... | 43/61 |
| 3,303,600 A * | 2/1967 | Freeman | ......................... | 43/131 |
| 3,488,879 A * | 1/1970 | Laughlin | ......................... | 43/131 |
| 3,661,326 A * | 5/1972 | Wilson | ........................... | 43/120 |
| 3,791,065 A * | 2/1974 | Snow | ................................ | 43/69 |
| 4,026,064 A * | 5/1977 | Baker | ............................. | 43/131 |
| 4,062,142 A * | 12/1977 | Marotti | ........................... | 43/131 |
| 4,157,628 A * | 6/1979 | Saslove | ........................... | 43/65 |
| 4,161,079 A * | 7/1979 | Hill | ................................ | 43/131 |
| 4,453,337 A * | 6/1984 | Williams | ........................ | 43/131 |
| 4,619,071 A * | 10/1986 | Willis | ............................ | 43/131 |
| 4,658,536 A * | 4/1987 | Baker | ............................ | 43/131 |
| 4,748,766 A * | 6/1988 | Stimac | ............................ | 43/69 |
| 4,823,504 A * | 4/1989 | Ronning | .......................... | 43/96 |
| 4,831,775 A * | 5/1989 | Sherman | ........................ | 43/131 |
| 4,876,821 A * | 10/1989 | Benzie | ............................ | 43/69 |
| 5,018,299 A * | 5/1991 | Peek et al. | ........................ | 43/131 |
| 5,136,803 A * | 8/1992 | Sykes et al. | ..................... | 43/131 |
| 5,148,625 A * | 9/1992 | Saleman | ......................... | 43/121 |
| 5,175,956 A * | 1/1993 | Hover et al. | ..................... | 43/58 |
| 5,327,673 A * | 7/1994 | Paglia | ............................ | 43/61 |
| 5,448,852 A * | 9/1995 | Spragins et al. | ................ | 43/131 |
| 5,584,139 A * | 12/1996 | Wentworth | ...................... | 43/58 |
| 5,628,143 A * | 5/1997 | Doucette | ......................... | 43/131 |
| 5,682,705 A * | 11/1997 | Stahl | .............................. | 43/66 |
| 5,771,628 A * | 6/1998 | Nobbs | ............................ | 43/121 |
| 5,806,237 A * | 9/1998 | Nelson et al. | .................. | 43/131 |
| 5,857,286 A * | 1/1999 | Doucette | ......................... | 43/131 |
| 5,966,863 A * | 10/1999 | Payton et al. | ................... | 43/131 |
| 6,029,393 A * | 2/2000 | Stewart | ............................ | 43/63 |

(Continued)

FOREIGN PATENT DOCUMENTS

| | | | | |
|---|---|---|---|---|
| EP | 1201124 A2 * | 5/2002 | ............ | A01M 25/00 |
| FR | 2564287 A1 * | 11/1985 | ............ | A01M 25/00 |

(Continued)

*Primary Examiner* — Darren W Ark
(74) *Attorney, Agent, or Firm* — Mitchell Intellectual Property Law, PLLC

(57) ABSTRACT

A method of controlling rats and the like by magnetically attaching a pest control device to a dumpster.

20 Claims, 4 Drawing Sheets

(56) References Cited

U.S. PATENT DOCUMENTS

| | | | |
|---|---|---|---|
| 6,058,646 A * | 5/2000 | Bishoff et al. | 43/131 |
| 6,079,151 A * | 6/2000 | Bishoff et al. | 43/131 |
| 6,082,042 A * | 7/2000 | Issitt | 43/131 |
| 6,164,010 A * | 12/2000 | Snell et al. | 43/131 |
| 6,397,517 B1 * | 6/2002 | Leyerle et al. | 43/131 |
| 6,470,622 B1 * | 10/2002 | Braun | 43/131 |
| 6,493,988 B1 * | 12/2002 | Johnson | 43/131 |
| 6,520,367 B1 * | 2/2003 | Piroch | 220/483 |
| 6,539,663 B2 * | 4/2003 | Mosher | 43/61 |
| 6,671,999 B1 * | 1/2004 | Doucette | 43/131 |
| 6,789,352 B2 * | 9/2004 | Price et al. | 43/131 |
| 6,807,768 B2 * | 10/2004 | Johnson et al. | 43/131 |
| 6,860,060 B2 * | 3/2005 | Hayes et al. | 43/131 |
| 6,874,274 B2 * | 4/2005 | Townsend | 43/131 |
| 7,165,353 B2 * | 1/2007 | Matts et al. | 43/131 |
| 7,249,436 B2 * | 7/2007 | Ravenelle et al. | 43/98 |
| 7,299,587 B1 * | 11/2007 | Metcalfe | 43/131 |
| 7,343,710 B2 * | 3/2008 | Metcalfe | 43/121 |
| D587,779 S * | 3/2009 | Cink | D22/122 |
| 7,584,865 B2 * | 9/2009 | Hsing-Hsien | 220/483 |
| 7,634,868 B2 * | 12/2009 | Stephens | 43/131 |
| 7,736,605 B1 * | 6/2010 | Gomez | 43/124 |
| 7,874,098 B2 * | 1/2011 | Vickery et al. | 43/131 |
| 8,028,468 B1 * | 10/2011 | Walsh et al. | 43/131 |
| 8,209,900 B2 * | 7/2012 | Vickery et al. | 43/131 |
| 8,302,345 B2 * | 11/2012 | Nelson et al. | 43/131 |
| 8,387,305 B2 * | 3/2013 | Cink et al. | 43/131 |
| 8,490,324 B2 * | 7/2013 | Highet et al. | 43/131 |
| 2002/0043018 A1 * | 4/2002 | Townsend | 43/131 |
| 2004/0079025 A1 * | 4/2004 | Snell et al. | 43/131 |
| 2005/0028431 A1 * | 2/2005 | Hoyes et al. | 43/131 |
| 2005/0097811 A1 * | 5/2005 | Scribner | 43/131 |
| 2005/0274060 A1 * | 12/2005 | Lederle et al. | 43/132.1 |
| 2006/0117644 A1 * | 6/2006 | Hoyes et al. | 43/131 |
| 2008/0072475 A1 * | 3/2008 | Nelson et al. | 43/131 |
| 2008/0163541 A1 * | 7/2008 | Harris | 43/131 |
| 2008/0168979 A1 * | 7/2008 | Goehring et al. | 220/230 |
| 2008/0302000 A1 * | 12/2008 | Kidder | 43/131 |
| 2009/0100744 A1 * | 4/2009 | Endepols | 43/131 |
| 2009/0199458 A1 * | 8/2009 | Highet et al. | 43/131 |
| 2009/0272743 A1 * | 11/2009 | Meulen | 220/230 |
| 2009/0307963 A1 * | 12/2009 | Abbas | 43/131 |
| 2010/0050498 A1 * | 3/2010 | Nelson et al. | 43/131 |
| 2010/0162614 A1 * | 7/2010 | Cink et al. | 43/131 |
| 2011/0035988 A1 * | 2/2011 | Mountzoures | 43/124 |
| 2011/0042253 A1 * | 2/2011 | Levine | 220/230 |
| 2011/0119806 A1 * | 5/2011 | Noble | 43/107 |
| 2011/0289824 A1 * | 12/2011 | Wu et al. | 43/132.1 |
| 2012/0102821 A1 * | 5/2012 | Jovic et al. | 43/131 |
| 2012/0124891 A1 * | 5/2012 | Jovic et al. | 43/131 |

FOREIGN PATENT DOCUMENTS

| | | | | |
|---|---|---|---|---|
| GB | 2063040 A * | 6/1981 | | A01M 25/00 |
| JP | 2000325003 A * | 11/2000 | | A01M 1/20 |
| JP | 2008289439 A * | 12/2008 | | A01M 1/20 |
| JP | 2009011239 A * | 1/2009 | | A01M 1/20 |
| JP | 2009027930 A * | 2/2009 | | A01M 1/20 |
| JP | 2009039045 A * | 2/2009 | | A01M 1/20 |
| JP | 2009207429 A * | 9/2009 | | A01M 1/20 |
| JP | 2012051649 A * | 3/2012 | | A01M 1/20 |

* cited by examiner

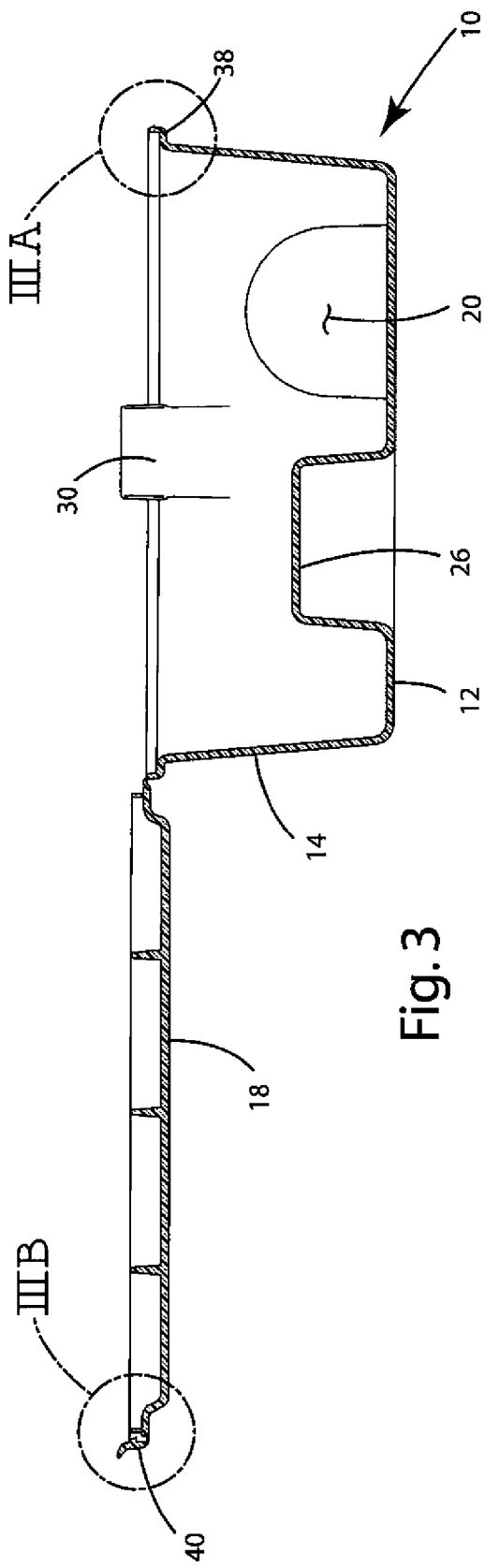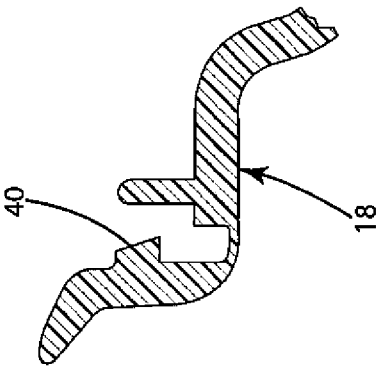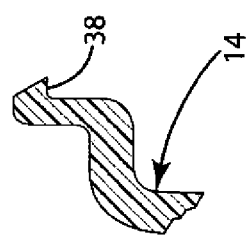

METHOD FOR PEST CONTROL

This is a divisional of application Ser. No. 12/855,460, filed Aug. 12, 2010.

FIELD OF THE INVENTION

The present invention relates to the field of animal pest control devices such as traps and poison dispensers or bait stations.

BRIEF SUMMARY OF THE INVENTION

The present invention is a pest control device and a method for using same, in which the device is magnetically secured to dumpsters frequented by rats and other rodents. The pest control device comprises a box with a lid which opens to allow easy access to the inside of the device where the bait is placed, and a hole in at least one of the walls of the box to allow animals to enter the trap and consume the bait. The box also has at least one magnet near the top edge of a wall of the box, which can be used to adhere the trap to dumpster, such that the lid is trapped in the closed position when the device is magnetically attached to the dumpster, thereby holding the lid closed and preventing access to the bait other than through the hole or holes designed to allow animals to enter. These and other objects, advantages and features of the invention will be more fully understood and appreciated by reference to the following description and the appended claims.

BRIEF DESCRIPTION OF THE DRAWINGS

FIG. 3 is a cross sectional side view of the pest control device.

FIG. 3A is a detailed view of the cross section of the lip around the top edge of the bottom portion of the pest control device.

FIG. 3B is a detailed view of the cross section of the snapping portion of the lid.

DESCRIPTION OF THE PREFERRED EMBODIMENT

Figure 1:
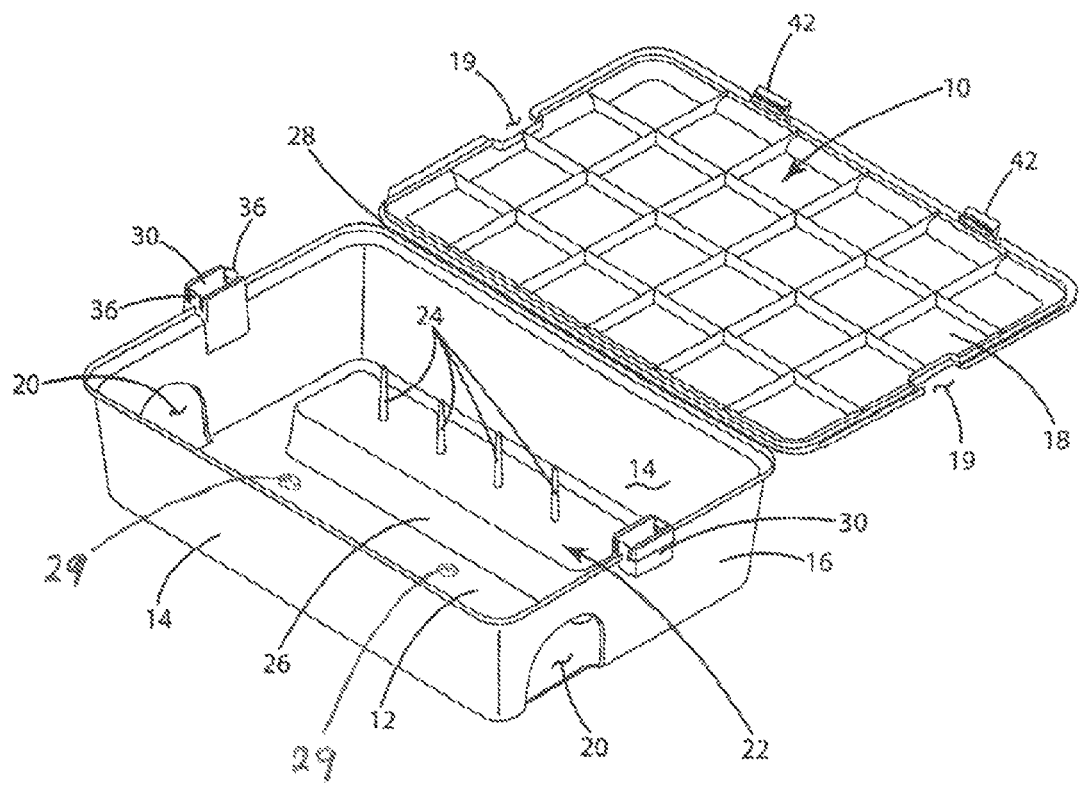
FIG. 1 is a top perspective view of the pest control device with the lid open.

On the bottom 12 of the device 10, a bait holder 22 is provided, to secure bait 13 in the pest control device 10. The term "bait" as used herein is intended to include poisonous bait. The bait holder 22 may preferably comprise, for example, spikes 24 extending upwardly from the bottom of the device 10, such that bait can be secured on the spikes 24. Additionally, the bait holder 22 may optionally be raised off of the bottom 12 on a platform 26, such that the bait is held above the bottom 12 and safely out of any liquid that may have a tendency to accumulate in the device 10. To further prevent the soaking of the bait in any liquid that may accumulate in the device 10, at least one drainage hole 29 may optionally be provided in the bottom 12 of the device 10. The lid 18 is preferably hinged at 28 to back wall 14 of the box portion of device 10.

On the bottom 12 of the device 10, a bait holder 22 is provided, to secure bait 13 in the pest control device 18. The term "bait" as used herein is intended to include poisonous bait. The bait holder 22 may preferably comprise, for example, spikes 24 extending upwardly from the bottom of the device 10, such that bait can be secured, on the spikes 24. Additionally, the bait holder 22 may optionally be raised off of the bottom 12 on a platform 26, such that the bait is held above the bottom 12 and safely out of any liquid that may have a tendency to accumulate in the device 10. To further prevent the soaking of the bait in any liquid that may accumulate in the device 10, at least one drainage hole 28 may optionally be provided in the bottom 12 of the device 10. The lid 18 is preferably a hinged lid 18.

Magnet-receiving members 30, capable of receiving magnets 32 or otherwise allowing for the attachment of magnets 32 to the end walls, 16 are provided at the top edge of at least one pair of opposed end walls 16, preferably near the top of two opposing walls 16. In one embodiment, the magnets 32 may have shaped features, e.g. notches 34, which allow the magnets 32 to be mechanically held in place by a detent 36 in magnet receiving member 30. (FIGS. 1 and 2) The lid 18 is shaped to provide cut away portions 19 over magnet retainers 30. This allows the magnets 32 to come into direct contact with the magnetic, metallic surface of a dumpster. When magnets 32 are inserted into the magnet-receiving portions 30, such magnets 32 operate to secure the pest control device 10 to a magnetic, metallic surface of a dumpster, typically the bottom.

Preferably, the dimensions of the device 10 are such that the bait for the desired animal can be held by the device 10, and the desired animal is able to enter into the device 10 and eat the bait. One example would be a device 10 that is intended for rats where the side walls 14 are about 12 inches long, the end walls are about 7.75 inches long, and the height of the side walls 14 and end walls 16 is about 3.5 inches. The holes 20 are also preferably sized to allow the animal for which the device 10 is designed to enter the device 10, and also to prevent the entry of children or other animals such as pets that the user desires to keep out of the device 10 and away from the bait. In the example of a rat trap, such holes 211 may be about 2.25 inches in diameter, which would allow the rat to enter, but would prevent larger animals and most children's hands from entering the pest control device 10. The dimensions of the device 10 described herein are not intended to be limiting, merely an example of one potential size configuration that can be used when rats are the animal that the device 10 is intended to attract or catch.

The lid 18 is the preferred embodiment allows for ready access to the bait holder 22 in the device 10 when the device 10 is not secured to a dumpster. However when the lid 18 is closed, and the device 10 is secured to a dumpster using the magnets 32, the lid 18 is trapped between the top edge of the walls 14, 16 and the magnetic surface of the dumpster, thereby holding the lid 18 closed, sealing the bait inside the device 10, and limiting access to the bait to animals that are sufficiently small that they are able to enter through the holes 20 in the side wails 14, 16, thereby limiting access to the bait to the intended targets of the pest control device 10. If a hinged lid 18 is present, the hinged lid 18 is rotatably connected to one of the walls 14 by a molded in place plastic hinge 28 along the top of the wall 14.

Figure 2:
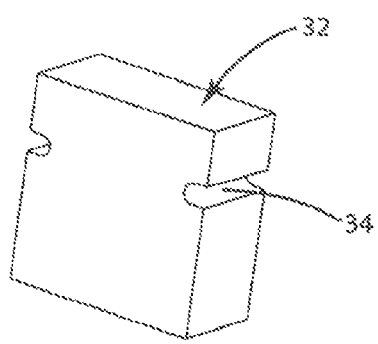
FIG. 2 is a top perspective view of the magnet.
Figure 4:
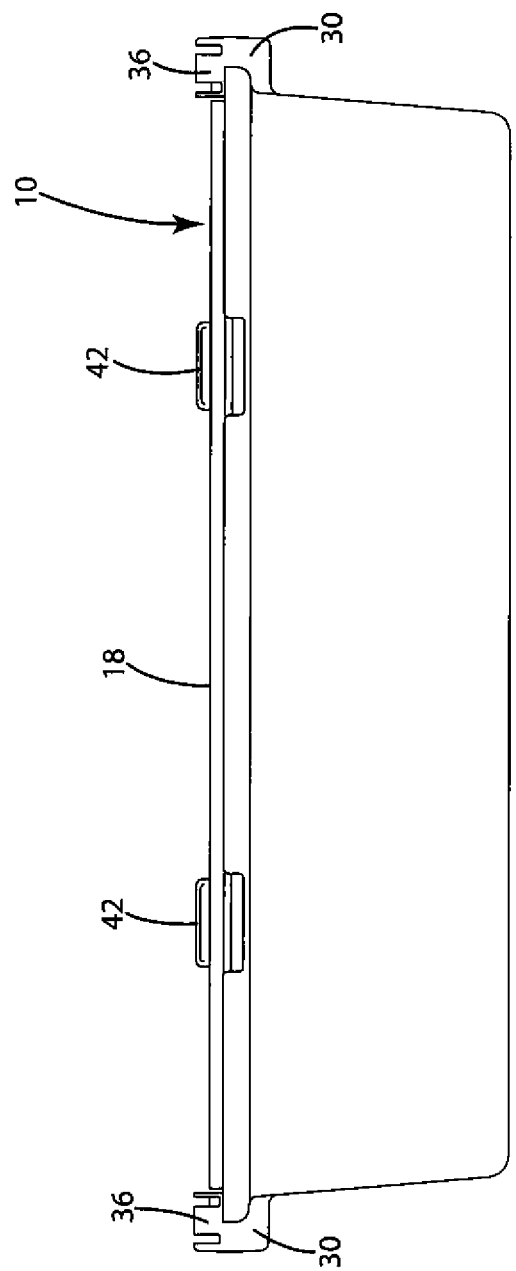
FIG. 4 is a side view of the pest control device in the closed position.
Figure 5:
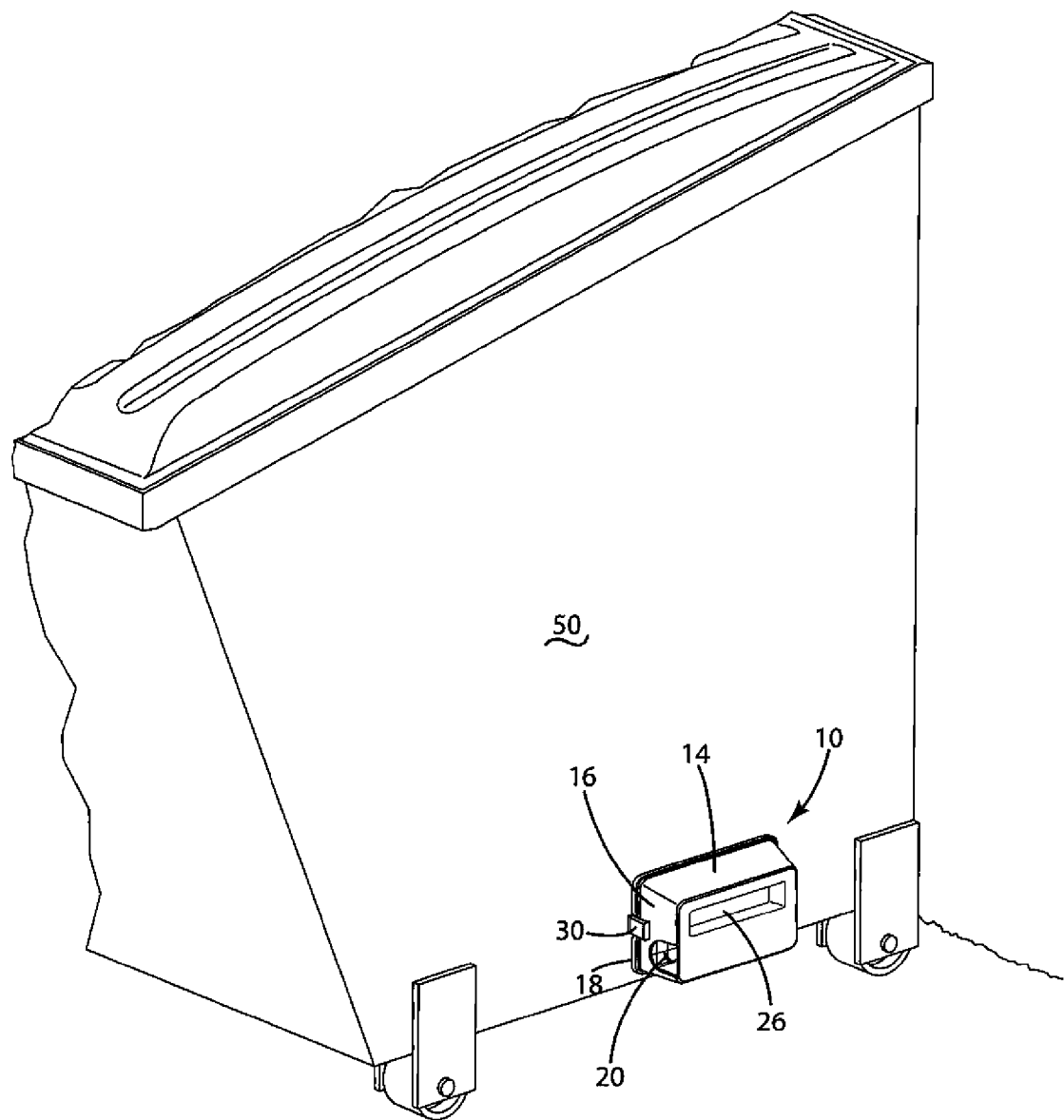
FIG. 5 is a bottom perspective view of a dumpster with the pest control device magnetically attached.

The lid 18 may optionally be secured in the closed position by the use of a snap-lock feature, a latching feature or a lock. (FIGS. 1 and 3). For example, the lid 18 and the walls 14, 16 may be provided with interlocking mechanical features, such as a protruding lip 38 on the top edge of the walls 14, 16 and a shaped edge 40 on the hinged rid 18 designed to "snap" over the protruding lip 38 of the walls 14, 16. (FIGS. 3, 3A, 3B). As another example, the device 10 may optionally be provided with a mechanical latching mechanism 42 on the lid 18 which is secured over a protruding lip 38 of the walls 14, 16, or with a mechanical latching mechanism 42 on the wails 14, 16 to be secured over the hinged lid 38. (FIG. 1) A latching mechanism 42 could also be modified to permit insertion of a padlock or other lock to keep the device 10 closed.

A hinged lid 18 is preferred in that it eliminates the potential for lost components of the device 10. However, a fully removable lid 18 could also be used.

The magnetic fastening of the pest control device 10 allows the trap to be securely hut removably secured to dumpsters in locations where animal pests may be present. The ability to remove and reposition the trap 10, allows the device 10 to be easily emptied or re-filled, but prevents access to the device 10 by children or pets.

The bait holder 22 is preferably also designed, to limit the access to the bait to animals who are inside the device 10, such as by locating the bait toward one side 14 of the device 10 not directly in line with the holes 20, thereby making it more difficult to reach the bait from outside the device 10.

To use the device 10 described herein, bait is loaded into the bait holder 22 through the top opening when the hinged lid 18 is opened. Once the device 10 is loaded with bait, the hinged lid 18 is closed, and then the device 10 is placed along the side or underside of a dumpster. Particularly, using the magnets 32 to secure the device 10 to the dumpster allows the dumpster to be moved and tipped and loaded and unloaded without disturbing the device 10 and without the need to reposition the device 10.

It will be apparent to those skilled in the pertinent arts that still other embodiments of pest control device 10 in accordance with the invention can be designed, and modifications and variations of the above-described illustrative embodiment of the invention may be effected without departing from the spirit and scope of the novel concepts of the invention.

The invention claimed is:

1. A method of trapping or eliminating animal pests, comprising:
   providing a pest control device, the pest control device comprising:
      a box with a bottom, walls projecting upwardly therefrom, an interior of said box defined by said walls and said bottom, and an open top with an openable lid having an open position for opening said open top and a closed position for closing said open top;
      at least one entry opening in one of said walls which is sized to allow an animal to enter the device; and
      at least one magnet, which is positioned on and at a top of at least one of said walls such that said box can be attached to a magnetically active surface, and such that when said pest control device is attached to the magnetically active surface by said at least one magnet, said openable lid is held in the closed position by being trapped between said box and the magnetically active surface;
   wherein said lid has at least one opening which is positioned over said at least one magnet such that said at least one magnet extends through said at least one opening when said lid is in the closed position, whereby said at least one magnet can make contact with the magnetically active surface;
   attaching said pest control device to the magnetically active surface by engaging said at least one magnet with the magnetically active surface.

2. The method of claim 1 in which said at least one magnet includes two of said magnets, located on opposite walls of said walls of said device, on and at the tops thereof.

3. The method of claim 2 in which said at least one opening of said lid further comprises openings which are positioned over said magnets when said lid is in the closed position, whereby said magnets can make contact with the magnetically active surface.

4. The method of claim 3 in which said box includes a bait holder inside said box, and said method includes baiting said bait holder.

5. The method of claim 4 in which said box walls include two side walls and two end walls; said magnets being located on said end walls, at the tops thereof; said at least one entry opening being located in one of said end walls, closer to one of said side walls than the other of said side walls; said bait holder being located near the other of said side walls, whereby said bait holder is offset from said at least one entry opening and not easily accessible, except to an animal entering the interior of said box.

6. The method of claim 5 in which said at least one entry opening further comprises two entry openings, one of said two entry openings in each of said end walls, both of said two entry openings located closer to said one of said side walls than the other of said side walls.

7. The method of claim 6 wherein said bait holder comprises at least one spike positioned on a platform which projects above a level of said bottom of said box.

8. The method of claim 7 wherein each of said magnets is positioned in a magnet receiving member on each of said end walls of said box.

9. The method of claim 8 wherein said openable lid is hinged to said box.

10. The method of claim 9 wherein one or more latches is provided to secure said lid in the closed position on said box.

11. The method of claim 10 wherein a drainage hole is provided in the bottom of said box to allow for the drainage of liquids from inside the box.

12. The method of claim 1 in which said walls of said box include two side walls and two end walls; said at least one magnet including two of said magnets, one of said magnets located on each of said end walls at the top thereof; said at least one entry opening comprising two of said entry openings, one of said entry openings being located in each of said end walls, closer to one of said side walls than the other of said side walls; a bait holder in said box being located near the other of said side walls, whereby said bait holder is offset from said entry openings and not easily accessible, except to an animal entering the interior of said box; said method including baiting said bait holder.

13. The method of claim 12 wherein said bait holder comprises at least one spike positioned on a platform which projects above a level of said bottom of said box.

14. A method of trapping or eliminating animal pests, comprising:
   providing a pest control device, the pest control device comprising:
      a box with a bottom, walls projecting upwardly therefrom, an interior of said box defined by said walls and said bottom, and an open top with an openable lid having an open position for opening said open top and a closed position for closing said open top;
      at least one entry opening in one of said walls which is sized to allow an animal to enter the device; and
      at least one magnet, which is positioned on and at a top of at least one of said walls such that said box can be attached to a magnetically active surface, and such that when said pest control device is attached to the magnetically active surface by said at least one magnet, said openable lid is held in the closed position by being trapped between said box and the magnetically active surface;

wherein said lid has at least one opening which is positioned over said at least one magnet such that said at least one magnet extends through said at least one opening when said lid is in the closed position, whereby said at least one magnet can make contact with the magnetically active surface; and a bait holder inside said box, comprising a platform positioned at the top of platform walls projecting upwardly from said bottom of said box, whereby bait placed therein is kept dry; and said method including baiting said bait holder.

15. The method of claim 14 in which said box walls include two side walls and two end walls; said at least one entry opening being located in one of said end walls, closer to one of said side walls than the other of said side walls; said bait holder being located near the other of said side walls, whereby said bait holder is offset from said at least one entry opening and not easily accessible, except to an animal entering the interior of said box.

16. The method of claim 15 in which said at least one entry opening further comprises two of said openings, one of said two entry openings in each of said end walls, both of said two entry openings located closer to said one of said side walls than the other of said side walls.

17. The method of claim 16 wherein said bait holder comprises at least one spike projecting upwardly from said platform.

18. The method of claim 17 wherein a drainage hole is provided in the bottom of said box to allow for the drainage of liquids from inside the box.

19. The method of claim 14 in which said walls include two side walls and two end walls; said at least one entry opening including two of said entry openings, one of said entry openings being located in each of said end walls, closer to one of said side walls than the other of said side walls; said bait holder in said box being located near the other of said side walls, whereby said bait holder is offset from said entry openings and not easily accessible, except to an animal entering the interior of said box.

20. The method of claim 19 wherein said bait holder comprises at least one spike projecting upwardly from said platform.

* * * * *